US007843623B2

(12) United States Patent
Cernasov

(10) Patent No.: US 7,843,623 B2
(45) Date of Patent: Nov. 30, 2010

(54) NON VOLATILE ADDRESSABLE ELECTRONIC PAPER WITH COLOR CAPABILITY

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 1013 days.

(21) Appl. No.: 11/560,487

(22) Filed: Nov. 16, 2006

(65) Prior Publication Data

US 2008/0117164 A1 May 22, 2008

(51) Int. Cl.
*G02B 26/00* (2006.01)

(52) U.S. Cl. ...................................................... 359/296

(58) Field of Classification Search .................. 359/296
See application file for complete search history.

(56) References Cited

U.S. PATENT DOCUMENTS 5,293,528 A 3/1994 DiSanto et al.
5,745,094 A 4/1998 Gordon, II et al.
5,872,552 A 2/1999 Gordon, II et al.
5,961,804 A 10/1999 Jacobson et al.
6,144,361 A 11/2000 Gordon, II et al.
6,172,798 B1 1/2001 Albert et al.
6,271,823 B1 8/2001 Gordon, II et al.
6,337,761 B1 1/2002 Rogers et al.
6,525,865 B2 2/2003 Katase
6,525,866 B1 2/2003 Lin et al.
6,529,313 B1 3/2003 Lin et al.
6,535,326 B2 3/2003 Uno
6,574,034 B1 6/2003 Lin et al.
6,636,341 B2 10/2003 Kanbe
6,639,580 B1 10/2003 Kishi et al.
6,650,462 B2 11/2003 Katase
6,650,463 B2 11/2003 Obikawa et al.
6,677,926 B2 1/2004 Biegelsen
6,680,726 B2 1/2004 Gordon, II et al.
6,693,621 B1 2/2004 Hayakawa et al.
6,710,540 B1 3/2004 Albert et al.
6,727,873 B2 4/2004 Gordon, II et al.
6,727,882 B1 4/2004 Large et al.

(Continued)

FOREIGN PATENT DOCUMENTS

JP 01-214820 * 8/1989

OTHER PUBLICATIONS

Definition of Electret from dectionary.com, origin 1880-85.*

(Continued)

*Primary Examiner*—Scott J Sugarman
*Assistant Examiner*—Vipin M Patel
(74) *Attorney, Agent, or Firm*—Ingrassia Fisher & Lorenz, P.C.

(57) ABSTRACT

In accordance with the invention, there are systems for electronic paper, apparatus for electrophoretic display, and methods of making an electrophoretic display. The apparatus for electrophoretic can include an electret substrate and a plurality of capsules disposed in the electret substrate, wherein each of the plurality of capsules can include a first plurality of charged pigments with a first color and a first charge, a second plurality of charged pigments with a second color and a second charge greater than the first charge, a third plurality of charged pigments with a third color and a third charge greater than the second charge, and a fluid, wherein the plurality of charged pigments are subjected to a non-uniform electric field.

14 Claims, 8 Drawing Sheets

U.S. PATENT DOCUMENTS

| | | | |
|---|---|---|---|
| 6,727,883 | B2 | 4/2004 | Uno et al. |
| 6,738,039 | B2 | 5/2004 | Goden |
| 6,741,385 | B2 | 5/2004 | Ikeda et al. |
| 6,750,844 | B2 | 6/2004 | Nakanishi |
| 6,751,007 | B2 | 6/2004 | Liang et al. |
| 6,751,008 | B2 | 6/2004 | Liang et al. |
| 6,762,744 | B2 | 7/2004 | Katase |
| 6,781,745 | B2 | 8/2004 | Chung et al. |
| 6,788,449 | B2 | 9/2004 | Liang et al. |
| 6,795,229 | B2 | 9/2004 | Liang et al. |
| 6,806,995 | B2 | 10/2004 | Chung et al. |
| 6,816,146 | B2 | 11/2004 | Harada et al. |
| 6,822,783 | B2 | 11/2004 | Matsuda et al. |
| 6,829,078 | B2 | 12/2004 | Liang et al. |
| 6,831,770 | B2 | 12/2004 | Liang et al. |
| 6,833,943 | B2 | 12/2004 | Liang et al. |
| 6,850,355 | B2 | 2/2005 | Liang et al. |
| 6,850,357 | B2 | 2/2005 | Kaneko et al. |
| 6,859,302 | B2 | 2/2005 | Liang et al. |
| 6,862,129 | B2 | 3/2005 | Matsuda et al. |
| 6,865,012 | B2 | 3/2005 | Liang et al. |
| 6,867,898 | B2 | 3/2005 | Liang et al. |
| 6,873,451 | B2 | 3/2005 | Ukigaya |
| 6,885,495 | B2 | 4/2005 | Liang et al. |
| 6,897,996 | B2 | 5/2005 | Ikeda et al. |
| 6,900,924 | B2 | 5/2005 | Goden |
| 6,906,851 | B2 | 6/2005 | Yuasa |
| 6,909,532 | B2 | 6/2005 | Chung et al. |
| 6,922,275 | B2 | 7/2005 | Ikeda |
| 7,307,779 | B1 * | 12/2007 | Cernasov et al. ............ 359/296 |
| 2004/0145561 | A1 | 7/2004 | Ikeda |
| 2005/0122564 | A1 | 6/2005 | Zehner et al. |
| 2006/0279527 | A1 * | 12/2006 | Zehner et al. ............... 345/107 |
| 2007/0297038 | A1 * | 12/2007 | Chopra et al. ............... 359/296 |

OTHER PUBLICATIONS

Cernasov, A.; USPTO Office Action dated Dec. 24, 2009, U.S. Appl. No. 11/534,370.
Cernasov, A.; Response to USPTO Office Action mailed Dec. 24, 2009, U.S. Appl. No. 11/534,370, Response dated Jan. 29, 2010.
Cernasov, A.; USPTO Office Action mailed Feb. 3, 2010, U.S. Appl. No. 11/534,370.
Cernasov, A.; USPTO Office Action mailed May 13, 2010, U.S. Appl. No. 11/534,370.
Cernasov, A.; Response to USPTO Office Action mailed May 13, 2010, U.S. Appl. No. 11/534,370, Response dated May 20, 2010.
Cernasov, A.; Office Action mailed Jul. 21, 2010, U.S. Appl. No. 11/534,370.
Cernasov, A.; Response dated Jul. 28, 2010 to USPTO Office Action mailed Jul. 21, 2010, U.S. Appl. No. 11/534,370.
Cernasov, A.; Notice of Appeal dated Jul. 29, 2010, U.S. Appl. No. 11/534,370.
Cernasov, A.; USPTO Office Action mailed Aug. 11, 2010, U.S. Appl. No. 11/534,370.
Cernasov, A.; USPTO Office Communication mailed Aug. 19, 2010, U.S. Appl. No. 11/534,370.

* cited by examiner

NON VOLATILE ADDRESSABLE ELECTRONIC PAPER WITH COLOR CAPABILITY

DESCRIPTION OF THE INVENTION

1. Field of the Invention

The subject matter of this invention relates to display systems. More particularly, the subject matter of this invention relates to an apparatus and a system for electronic paper with color capability.

2. Background of the Invention

Electronic paper or e-paper displays address the need for inexpensive yet flexible devices for large area and disposable applications which are unsuitable for standard liquid crystal displays (LCD) and light emitting diode (LED) displays.

Flexible e-paper displays generally use one of the two types of particle displays: suspended particle display (SPD) and electrophoretic image display (EPID). In a SPD, the orientation of the particles is selectively controlled to produce the optical contrast required for a display. In an EPID, the distribution of particle population is selectively controlled in order to produce the optical contrast required for a display. In both cases an electric field is used to control the particles. It should be noted that particles in both display types are suspended in a liquid medium, and in one case the response to the electric field is with respect to orientation, and in the other with respect to distribution.

SPDs are attractive due to their wide viewing angle, high optical transmission and ease of fabrication. In a SPD, light valve action is obtained when sub-micron sized particles with an asymmetric, plate-like shape align with an externally-applied electric field, and thus permit light to pass through (the "light" state). This alignment occurs because the external field induces a dipole moment in the molecules of the particles. In the absence of the external field, the particles orient randomly due to Brownian motion, and consequently block light (the "dark" state). A significant disadvantage of SPDs is that the light areas of the display must be continuously energized with the external electric field to maintain the display, thus consuming energy even when the image on the display is static. SPDs also typically lack a clear voltage threshold (threshold), and require active-matrix addressing for high resolution.

In EPIDs, the particles used in the display are electrically charged and may have a color that contrasts with the liquid used to suspend them. The EPID generally operates by reflection and absorption as opposed to transmission. Although EPIDs have some inherent memory, this memory is due to the viscosity of the liquid medium and therefore decays with time. And because there is no voltage threshold, making multiplexed displays is difficult.

Current e-paper displays have two major problems; volatility (they require continuous power for stable display) and lack of threshold thus making multiplexing and displaying color difficult. Current solutions for these problems, such as the use of TFT drives, limits the useful size of these displays and dramatically increase their costs. Hence, there is need to solve these and other problems of the prior art.

SUMMARY OF THE INVENTION

In accordance with the invention, there is a system for electronic paper. The system can include an electret substrate and a plurality of capsules disposed in the electret substrate, wherein each of the plurality of capsules can include a first plurality of charged pigments with a first color and a first charge, a second plurality of charged pigments with a second color and a second charge greater than the first charge, a third plurality of charged pigments with a third color and a third charge greater than the second charge, a fluid, and a spherically asymmetric and cylindrically symmetric housing configured to house the plurality of charged pigments and the fluid.

According to various embodiments, there is a system for electronic paper. The system can include an electret substrate including a majority of charges substantially at a surface of the electret and a plurality of capsules disposed in the electret substrate, wherein each of the plurality of capsules can include a first plurality of charged pigments with a first color and a first charge, a second plurality of charged pigments with a second color and a second charge greater than the first charge, a third plurality of charged pigments with a third color and a third charge greater than the second charge, a fluid, and a housing configured to house the plurality of charged pigments and the fluid.

According to another embodiment of the present teachings, there is an apparatus for an electrophoretic display. The apparatus can include an electret substrate and a plurality of capsules disposed in the electret substrate, wherein each of the plurality of capsules can include a first plurality of charged pigments with a first charge, a second plurality of charged pigments with a second charge greater than the first charge, a third plurality of charged pigments with a third charge greater than the second charge, and a fluid, wherein the plurality of charged pigments are subjected to a non-uniform electric field.

According to yet another embodiment, there is a method of making an electrophoretic display. The method can include providing an electret substrate and providing a plurality of capsules disposed in the electret substrate, wherein each of the plurality of capsules can include a first plurality of charged pigments with a first color and a first charge, a second plurality of charged pigments with a second color and a second charge greater than the first charge, a third plurality of charged pigments with a third color and a third charge greater than the second charge, and a fluid. The method can also include providing a plurality of first electrodes interfaced with a first side of the electret substrate, wherein the first electrodes are spatially separated from one another and providing a plurality of second electrodes interfaced with a second side of the electret substrate wherein the second electrodes are spatially separated from one another. The method can further include providing a power supply that provides an external electric field between one or more of the first electrodes and one or more of the second electrodes.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

As used herein, the terms "electronic paper" and "e-paper" are used interchangeably with the terms electrophoretic display, displacement particle display, particle display, flexible display, and disposable display. The term "charged pigment" is used interchangeably with the terms pigments, particles, charged particles, and charged pigment particles.

Figure 1B:
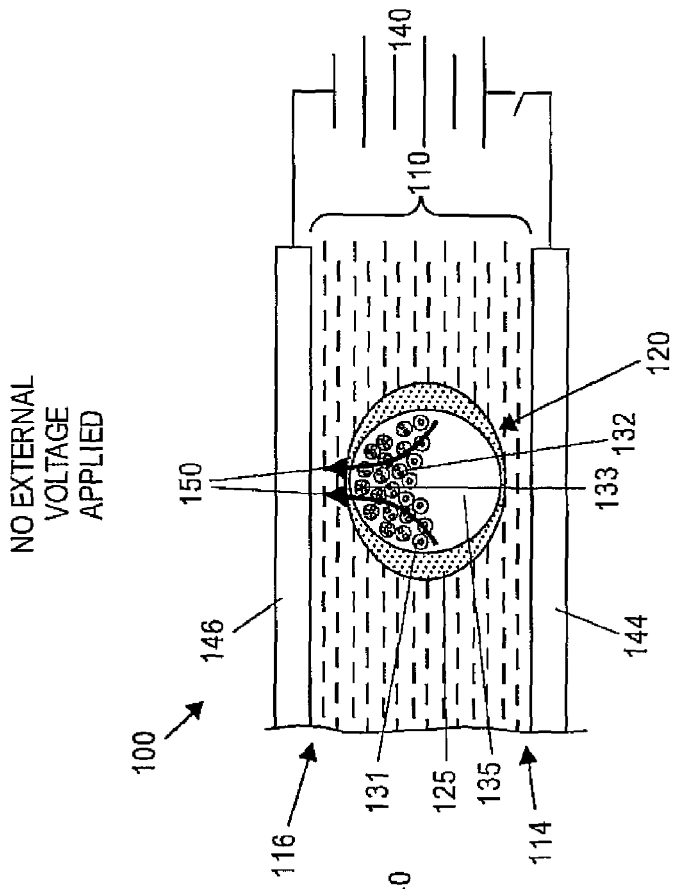
FIGS. 1A-1D schematically illustrate a portion of a pixel of a collection of pixels of exemplary systems for electronic paper.
Figure 1A:
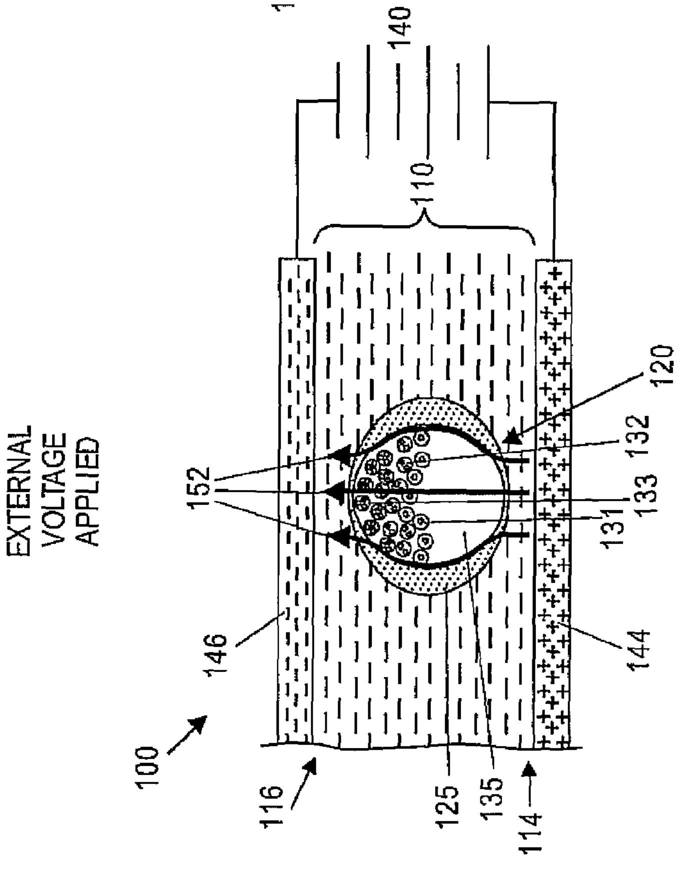

A system for electronic paper includes an array of pixels. The term "pixel" is used interchangeably herein with terms including cell and unit cell. FIGS. 1A-1D schematically illustrate a portion of a pixel of a collection of pixels of exemplary systems 100 and 100' for electronic paper. The exemplary system 100 for electronic paper as shown in FIGS. 1A and 1B can include an electret substrate 110 and a plurality of capsules 120 disposed in the electret substrate 110, wherein each of the plurality of capsules 120, can include a first plurality of charged pigments 131 with a first color and a first charge, a second plurality of charged pigments 132 with a second color and a second charge greater than the first charge, a third plurality of charged pigments 133 with a third color and a third charge greater than the second charge, a fluid 135, and a spherically asymmetric and cylindrically symmetric housing 125 configured to house the plurality of charged pigments 131, 132, 133 and the fluid 135. In various embodiments, the first plurality of charged pigments 131 with a first color and a first charge can have various amounts of charges.

Figure 2A:
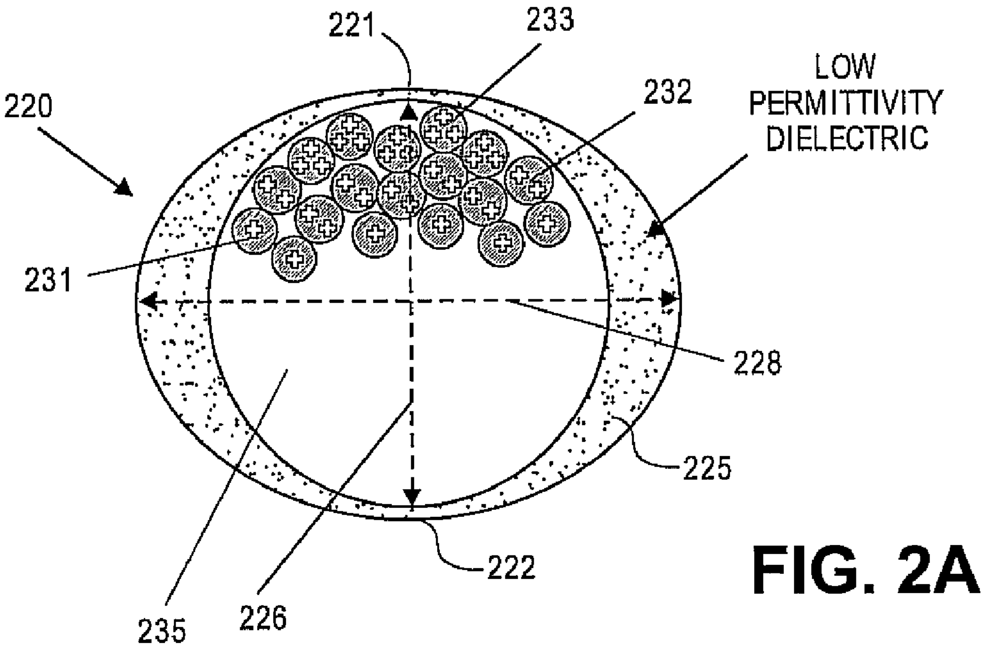
FIGS. 2A and 2B illustrate exemplary capsules for electronic paper.
Figure 2B:
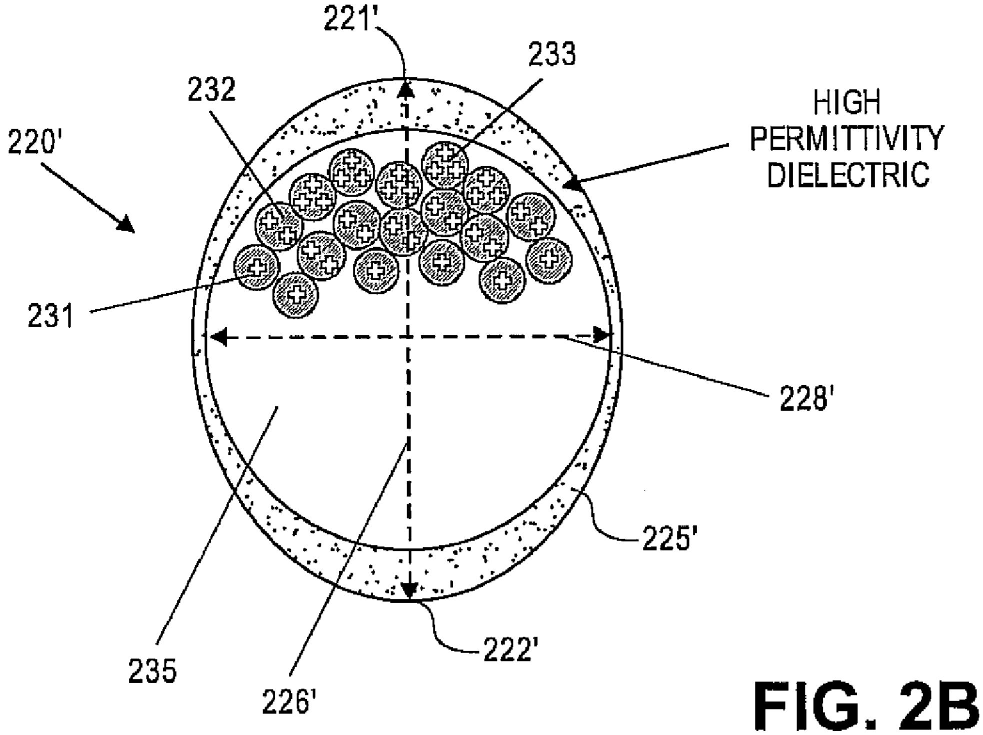

In various embodiments, the housing 125 can include one or more of a high permittivity dielectric material and a low permittivity dielectric material. In some embodiments, the housing 125, 225 can also include a low permittivity dielectric material in an oblate spheroid configuration as shown in FIG. 2A with a first pole 221 and a second pole 222 along the first axis 226 with a first thickness and an equator 228 with a second thickness, wherein the first thickness is less than the second thickness. In some other embodiments, the housing 225' as shown in FIG. 2B can include a high permittivity dielectric material in a prolate spheroid configuration with a first pole 221' and a second pole 222' along the first axis 226' with a first thickness and an equator 228' with a second thickness, wherein the first thickness is greater than the second thickness.

The exemplary system 100 for electronic paper can further include a plurality of first electrodes 144 interfaced with a first side 114 of the electret substrate 110, wherein the first electrodes 144 are spatially separated from one another, a plurality of second electrodes 146 interfaced with a second side 116 of the electret substrate 110, wherein the second electrodes 146 are spatially separated from one another, and a power supply 140 that can provide an external electric field between one or more of the first electrodes 144 and one or more of the second electrodes 146. The term "interfaced" used herein means "in physical contact with".

FIG. 1A depicts an exemplary system 100 in the presence of an external electric field, above a threshold value of the first, second, and third plurality of charged pigments 131, 132, 133, between one or more of the first electrodes 144 and one or more of the second electrodes 146. As a result, the first, second, and third plurality of charged pigments 131, 132, 133 move towards one or more of the electrodes 146 having a polarity that is opposite to that of the charged pigments 131, 132, 133 due to a composite electric field 152 and wherein the third plurality of charged pigments 133 displaces the first and the second plurality of charged pigments 131, 132 and thereby displaying the third color. The composite electric field 152 is the sum of the external electric field between one or more of the first electrodes 144 and one or more of the second electrodes 146 and a local electric field 150 between the charged pigments 131, 132, 133 and the electret substrate 110. FIG. 1B depicts the exemplary system 100 upon removal of the external electric field between one or more of the first electrodes 144 and one or more of the second electrodes 146. In the absence of the external electric field, the plurality of charged pigments 131, 132, 133 remain substantially in their position in response to the local electric field 150. The local electric field 150 is non-uniform because of the asymmetry of the housing 125 of the capsule 120. The local electric field 150 peaks when the plurality of charged pigments 131, 132, 133 are either in the front as shown in FIG. 1B or back (not shown). More particularly, in the absence of an external electric field, the electric field generated around the thicker part of the low permittivity housing 125 is smaller than the electric field generated around the thinner part of the housing 125. Accordingly, this results in a net field going from the thicker portions of the housing to the thinner portions of the housing, which is illustrated by the field arrows of the local electric field 150 in FIG. 1B. In some other embodiments, the capsule 200' can include a housing 225' as shown in FIG. 2B including a high permittivity dielectric in a prolate spheroid configuration. In this case, in the absence of an external electric field, the electric field generated around the thinner part of the high permittivity housing 225' can be smaller than the electric field generated around the thicker part of the housing 225'. Accordingly, this results in a net field going from the thinner portions of the housing 225' to the thicker portions of the housing 225' (not shown). The substantial ceasing of the movement of the charged pigments 131, 132, 133 and the anchoring effect is due to the local electric field 150 established between the charged pigments 131, 132, 133 and the oppositely charged electret substrate 110.

Figure 1D:
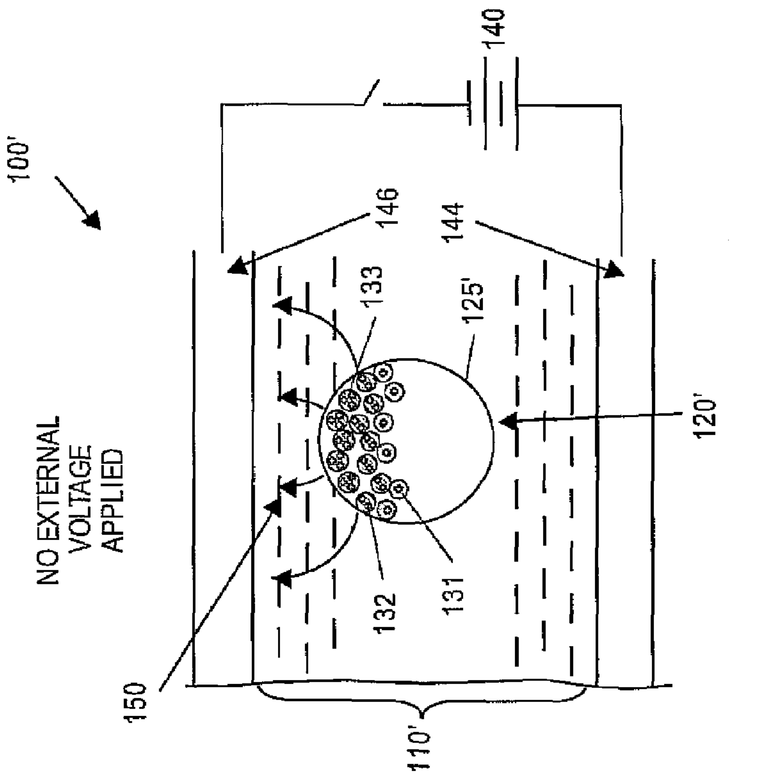
Figure 1C:
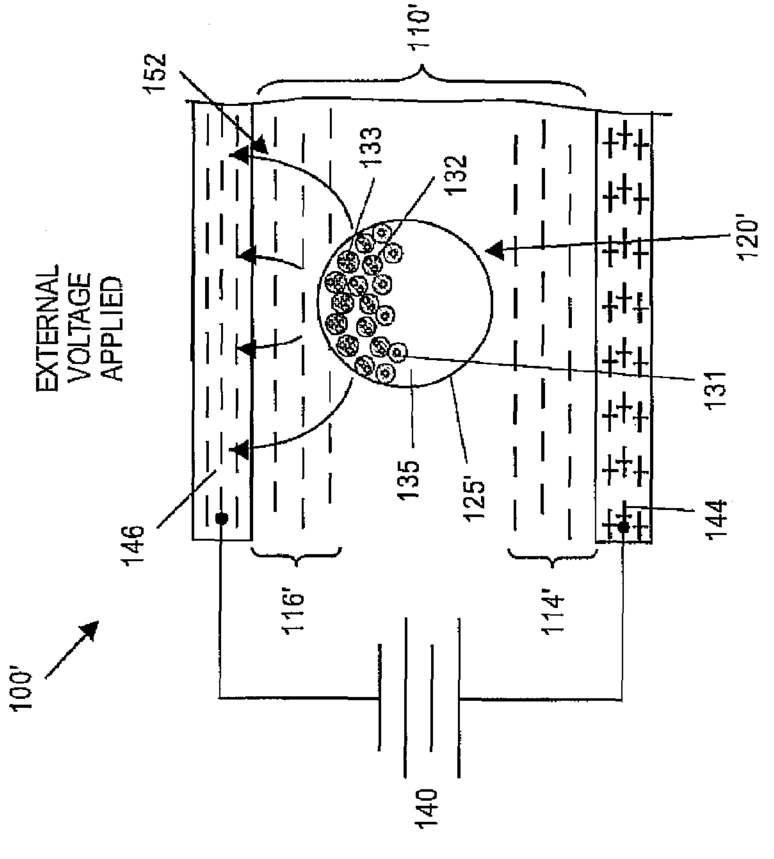

In various embodiments, the exemplary system 100' for electronic paper as shown in FIGS. 1C and 1D can include an electret substrate 110' including a majority of charges substantially at a surface 114', 116' of the electret substrate 110' and a plurality of capsules 120' disposed in the electret substrate 110', wherein each of the plurality of capsules 120', can include a first plurality of charged pigments 131 with a first color and a first charge, a second plurality of charged pigments 132 with a second color and a second charge greater than the first charge, a third plurality of charged pigments 133 with a third color and a third charge greater than the second charge, a fluid 135, and a housing 125' configured to house the plurality of charged pigments 131, 132, 133 and the fluid 135. In some embodiments, the housing 125' of the capsule 120' can be spherically and cylindrically symmetric, as shown in FIGS. 1C and 1D. In some other embodiments, the first plurality of charged pigments 131 with a first color and a first charge can have various amounts of charges.

The exemplary systems 100' for electronic paper can further include a plurality of first electrodes 144 interfaced with a first side 114' of the electret substrate 110', wherein the first electrodes 144 are spatially separated from one another, a plurality of second electrodes 146 interfaced with a second side 116' of the electret substrate 110', wherein the second electrodes 146 are spatially separated from one another, and a power supply 140 that can provide an external electric field between one or more of the first electrodes 144 and one or more of the second electrodes 146.

FIG. 1C depicts an exemplary system 100' in response to an external electric field between one or more of the first electrodes 144 and one or more of the second electrodes 146. When a voltage is applied between one or more of the first electrodes 144 and one or more of the second electrodes 146, one or more of the first electrodes 144 can develop a positive charge and one or more of the second electrodes 146 can develop a negative charge. As depicted in FIG. 1C, in response to the external electric field, above a threshold value of the first, second, and third plurality of charged pigments 131, 132, 133, the plurality of charged pigments 131, 132, 133 move in the direction of one or more of the second electrodes 146 having a negative polarity that is opposite to that of the charged pigments 131, 132, 133, due to a composite electric field 152'. The composite electric field 152' is the sum of the external electric field between one or more of the first electrodes 144 and one or more of the second electrodes 146 and a local electric field 150' between the charged pigments 131, 132, 133 and the electret substrate 110'. Upon removal of the external electric field between one or more of the first electrodes 144 and one or more of the second electrodes 146, the plurality of charged pigments 131, 132, 133 substantially remain in their position, as shown in FIG. 1D. The substantial ceasing of the movement of the charged pigments 131, 132, 133 and the anchoring effect is due to the local electric field 150' established between the charged pigments 131, 132, 133 and the majority of charges substantially at the surface 114', 116' of the electret substrate 110'.

The electret substrate 110, 110' can include one or more highly insulating clear polymer such as a fluoropolymer, a polypropylene, a polyethyleneterephthalate, etc., including either a substantially uniform distribution of charges or an inhomogeneous distribution of charges. According to various embodiments, an electret substrate 110, as shown in FIGS. 1A and 1B including a substantially uniform distribution of charges can be formed by stacking multiple layers of electret substrate, with each layer having a charge substantially the same as that of the layer underneath. In various embodiments, the electret substrate 110' as shown in FIGS. 1C and 1D, including a majority of charges substantially at a surface 114', 116' of the electret substrate 110', can be formed by stacking multiple layers of electret substrate, with layers at both sides having a substantially greater amount of charge than those in the middle. In some other embodiments, an inhomogeneous distribution of charges in an electret substrate 110' can be formed by exposing both sides of the electret substrate 110 to an intense source of electrons (not shown). The electrons from the intense source can penetrate the electret substrate 110 exponentially thereby giving an inhomogeneous distribution of charges to the electret substrate 110'. According to various embodiments, the electret substrate 110, 110' can have a total charge substantially the same but opposite in polarity to the total charge of the plurality of capsules 120, 120'. In other embodiments, the electret substrate 110, 110' can have a thickness less than or equal to about 10 times the diameter of a capsule 120, 120' and in some cases about 6 times the diameter of the capsule 120, 120' and in some other cases about 4 times the diameter of the capsule 120, 120'.

Referring back to FIGS. 2A and 2B, the housing 225, 225' of the capsule 120, 200, 200' can be implemented with a low permittivity dielectric material such as Teflon®, polyethylene, or other similar materials. In some embodiments, the housing 225, 225' of the capsule 120, 200, 200' can be implemented with a high permittivity dielectric material such as electroactive polymers and barium titanate composite. In various embodiments, the low permittivity dielectric material can have a permittivity in the range of about 1 to about 5 and the high permittivity dielectric materials can have a permittivity in the range of about 8 to about 1200. In some embodiments, the housing 225, 225' can be implemented as part of the electret substrate 110 that is not charged. More particularly, the capsule 120,120' can be embedded in the charged electret substrate 110, 110'. In certain embodiments, the capsules 120, 120' can have a size with diameter ranging from about 20 μm to about 200 μm, and in some cases from about 50 μm to about 100 μm.

In various embodiments, the first electrodes 144 and the second electrodes 146 can include a multiplexing electrode array. In some embodiments, the first electrodes 144 and the second electrodes 146 can include a standard X-Y Indium Tin Oxide ("ITO") array. The ITO array can be configured to provide control of the capsules 120,120' on a pixel basis. In some embodiments, a thin layer of aluminum or gold can be used as the first electrodes 144 and the second electrodes 146. In various embodiments, an electric field of up to 1 million Volt/meter can be developed between one or more of the first electrodes 144 and one or more of the second electrodes 146, by applying an exemplary voltage of about 50 V between one or more of the first electrodes 144 and one or more of the second electrodes 146, when the thickness of the electret substrate 110, 110' can be about 50 μm.

Figure 3A:
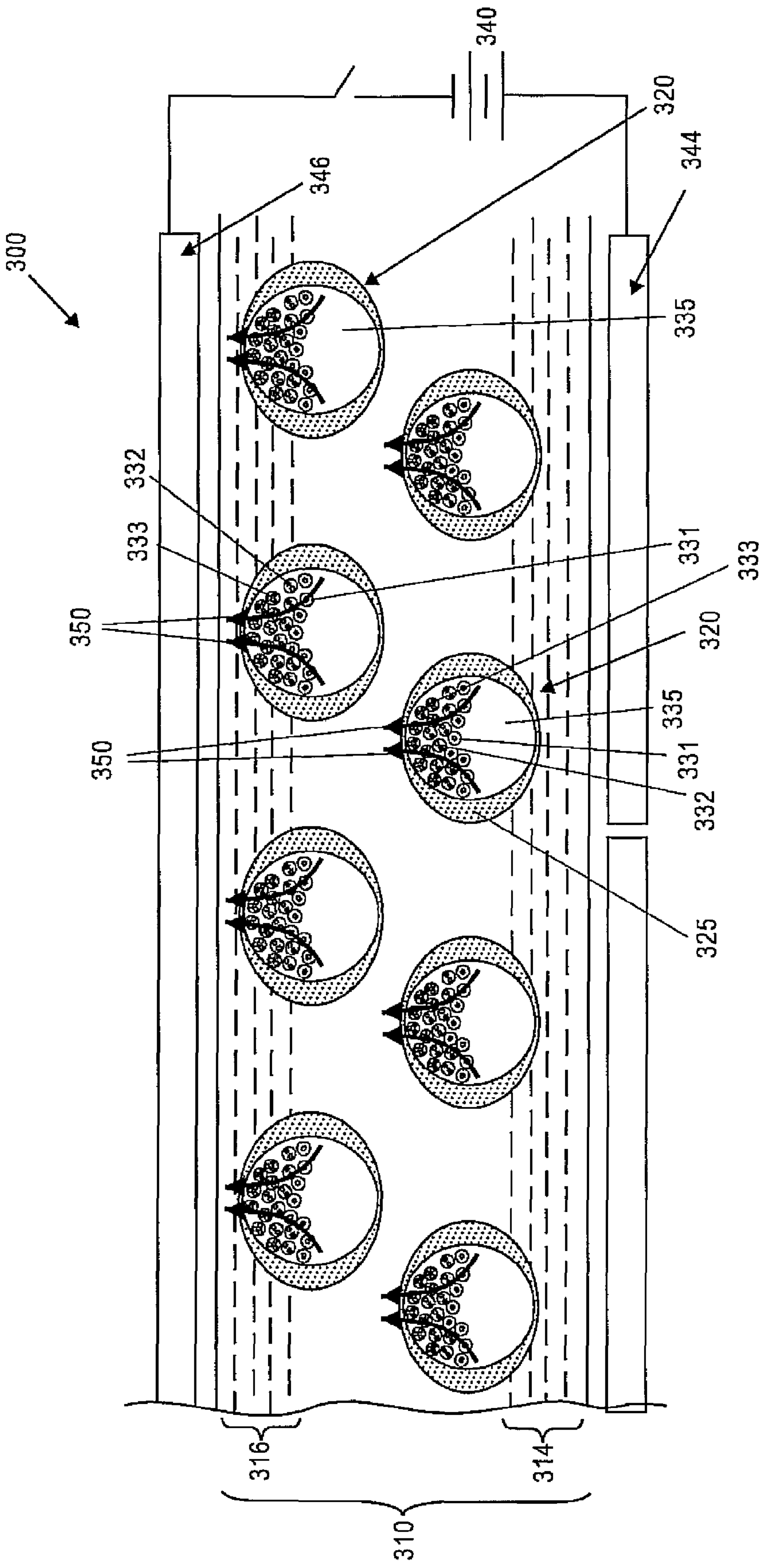
FIGS. 3A and 3B schematically illustrate exemplary apparatus for an electrophoretic display according to the present teachings.
Figure 3B:
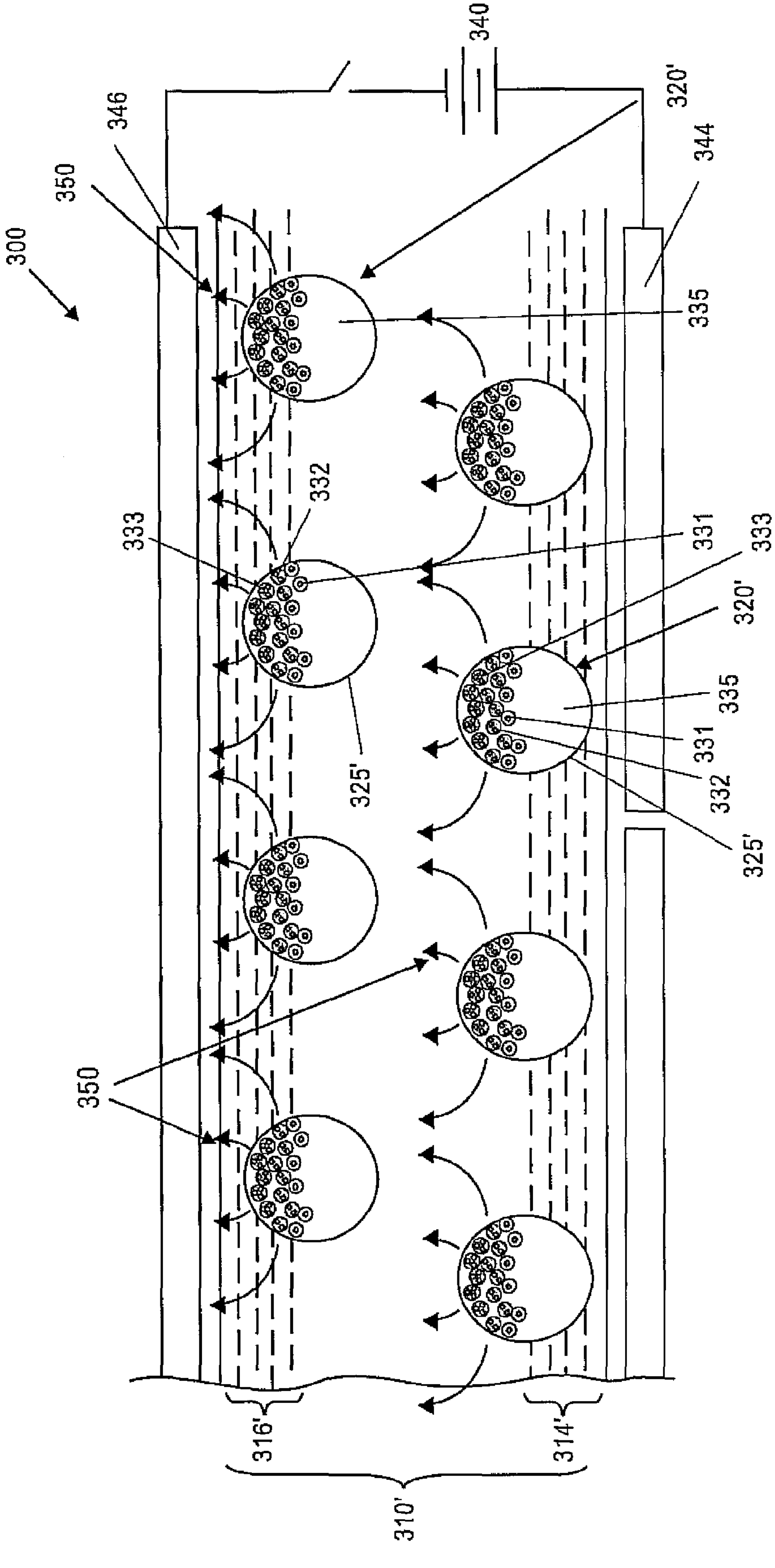

According to various embodiments, there is an apparatus 300, 300' for an electrophoretic display as shown in FIGS. 3A and 3B. The apparatus 300, 300' can include an electret substrate 310, 310' and a plurality of capsules 320, 320' disposed in the electret substrate 310, 310', wherein each of the plurality of capsules 320, 320' can include a first plurality of charged pigments 331 with a first color and a first charge, a second plurality of charged pigments 332 with a second color and a second charge greater than the first charge, a third plurality of charged pigments 333 with a third color and a third charge greater than the second charge, and a fluid 335, wherein the plurality of charged pigments 331, 332, 333 can be subjected to a non-uniform electric field 350. In various embodiments, the first plurality of charged pigments 331 with a first color and a first charge can have various amounts of charges.

In various embodiments, the non-uniform electric field 350 can be due to each of the plurality of capsules 320 including a spherically asymmetric and cylindrically symmetric housing 325, as shown in FIGS. 3A, 2A and 2B, configured to house the plurality of charged pigments 331, 332, 333 and the fluid 335. In various embodiments, the housing, 325, 225 can include a low permittivity dielectric material in an oblate spheroid configuration as shown in FIG. 2A with a first pole 221 and a second pole 222 along the first axis 226 with a first thickness and an equator 228 with a second thickness, wherein the first thickness is less than the second thickness. In some other embodiments, the housing 225' as shown in FIG. 2B can include a high permittivity dielectric material in a prolate spheroid configuration with a first pole 221 and a second pole 222 along the first axis 226 with a first thickness and an equator 228 with a second thickness, wherein the first thickness is greater than the second thickness. In some other embodiments, the housing 325' of the capsule 320' can be spherically and cylindrically symmetric, as shown in FIG. 3B.

In various embodiments, the non-uniform electric field 350 can be due to the electret substrate 310' including a majority of charges substantially at a surface 314', 316' of the electret substrate 310' as shown in FIG. 3B. In other embodiments, the exemplary apparatus 300 for electrophoretic display, as shown in FIG. 3A can include an electret substrate 310 including a substantially uniform distribution of charges. The apparatus 300, 300' can further include a plurality of first electrodes 344 interfaced with a first side 314, 314' of the electret substrate 310, 310', wherein the first electrodes 344 are spatially separated from one another, a plurality of second electrodes 346 interfaced with a second side 316, 316' of the electret substrate 310, 310', wherein the second electrodes 346 are spatially separated from one another, and a power supply 340 that can provide an external electric field between one or more of the first electrodes 344 and one or more of the second electrodes 346. In various embodiments, the first electrodes 344 and the second electrodes 346 can include a multiplexing electrode array. In some other embodiments, the first electrodes 344 and the second electrodes 346 can include a standard X-Y Indium Tin Oxide ("ITO") array.

According to various embodiments, there is a method of making an electrophoretic display 400A-400E as shown in FIGS. 4A-4E. The method of making an electrophoretic display 400A-400E can include providing an electret substrate 410 and providing a plurality of capsules 420 disposed in the electret substrate 410, wherein each of the plurality of capsules 420 can include a first plurality of charged pigments 431 with a first color and a first charge, a second plurality of charged pigments 432 with a second color and a second charge greater than the first charge, a third plurality of charged pigments 433 with a third color and a third charge greater than the second charge, and a fluid 435. The method can also include providing a plurality of first electrodes 444 interfaced with a first side 414 of the electret substrate 410, wherein the first electrodes 444 are spatially separated from one another, providing a plurality of second electrodes 446 interfaced with a second side 416 of the electret substrate 410 wherein the second electrodes 446 are spatially separated from one another, and providing a power supply 440 that provides an external electric field between one or more of the first electrodes 444 and one or more of the second electrodes 446.

Figure 4A:
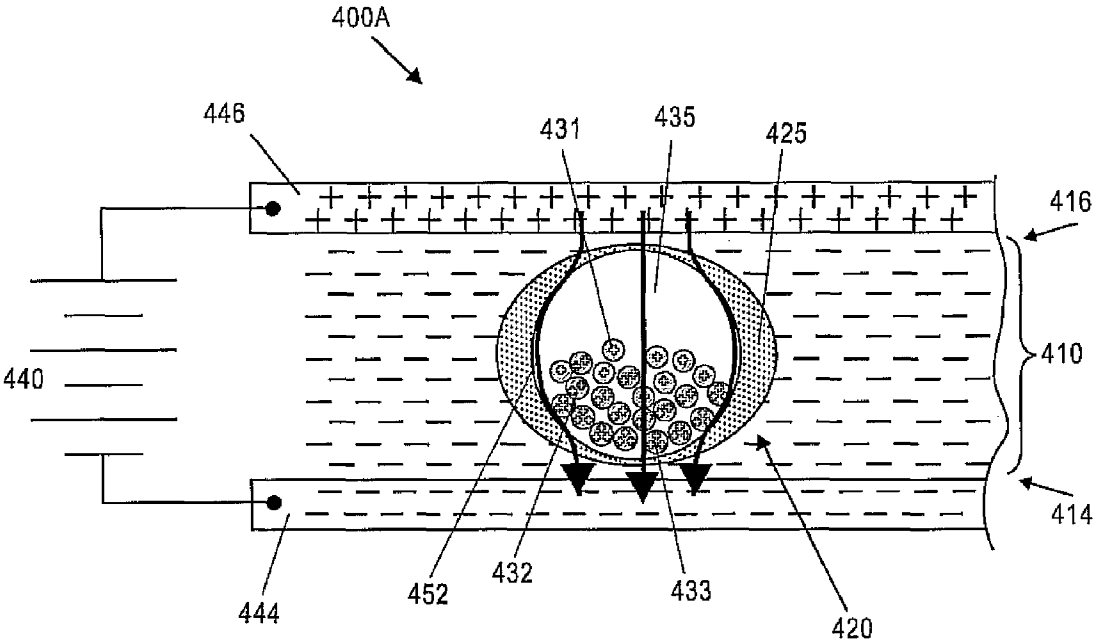
FIGS. 4A-4E schematically illustrates a method of making an electrophoretic display.
Figure 4B:
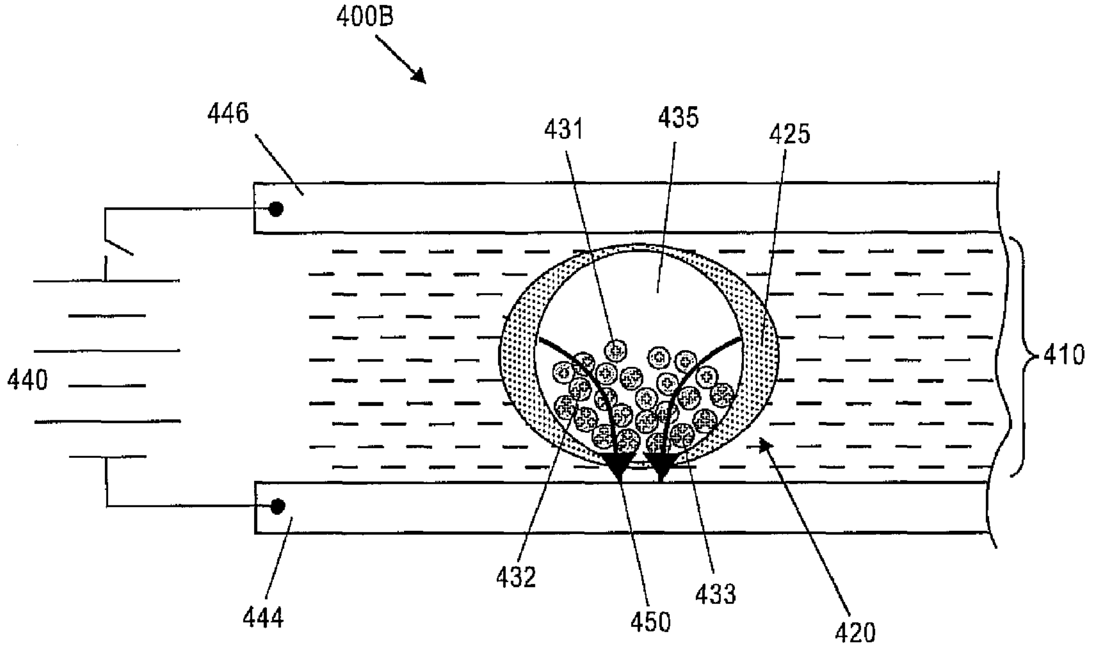

According to various embodiments, the method of making an electrophoretic display 400A-400E can further include subjecting the plurality of charged pigments 431, 432, 433 to a non-uniform local electric field 450 by one or more of providing an electret substrate 410 with a non-uniform distribution of charges as shown in FIGS. 1C, 1D and 3B and providing each of the plurality of capsules 420 with a spherically asymmetric but cylindrically symmetric housing 425, as shown in FIGS. 4A-4E, 2A, and 2B configured to house the plurality of charged pigments 431, 432, 433 and fluid 435. The method can also include applying an external electric field above a threshold value of the first, second, and third plurality of charged pigments 431, 432, 433, between one or more of the first electrodes 444 and one or more of the second electrodes 446, as shown in FIG. 4A. The application of an external electric field results in the movement of the first, second, and third plurality of charged pigments 431, 432, 433 towards one or more of the electrodes 444 having a polarity that is opposite to that of the charged pigments 431, 432, 433, and wherein the third plurality of charged pigments 433 displaces the first and second plurality of charged pigments 431, 432 and thereby displaying the third color. The movement of the charged pigments 431, 432, 433 towards one or more of the oppositely charged electrodes 444 can be due to a composite electric field 452, which is the sum of the external electric field between one or more of the first electrodes 444 and one or more of the second electrodes 446 and the local electric field 450 between the charged pigments 431, 432, 433 and the electret substrate 410. The method can further include removing the external electric field between one or more of the first electrodes 444 and one or more of the second electrodes 446, as shown in FIG. 4B, thereby substantially ceasing the movement of the charged pigments 431, 432, 433, and wherein the plurality of charged pigments 4311 432, 433 remain substantially in their position in response to the local electric field 450, which is non-uniform because of the asymmetry of the housing 425 of the capsule 420.

Figure 4C:
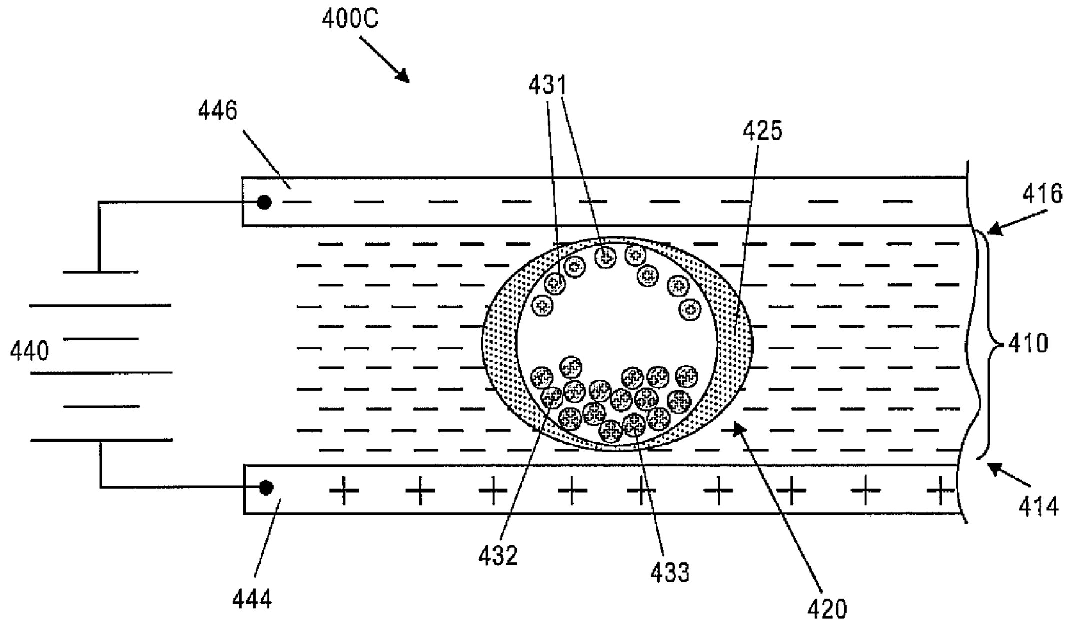
Figure 4D:
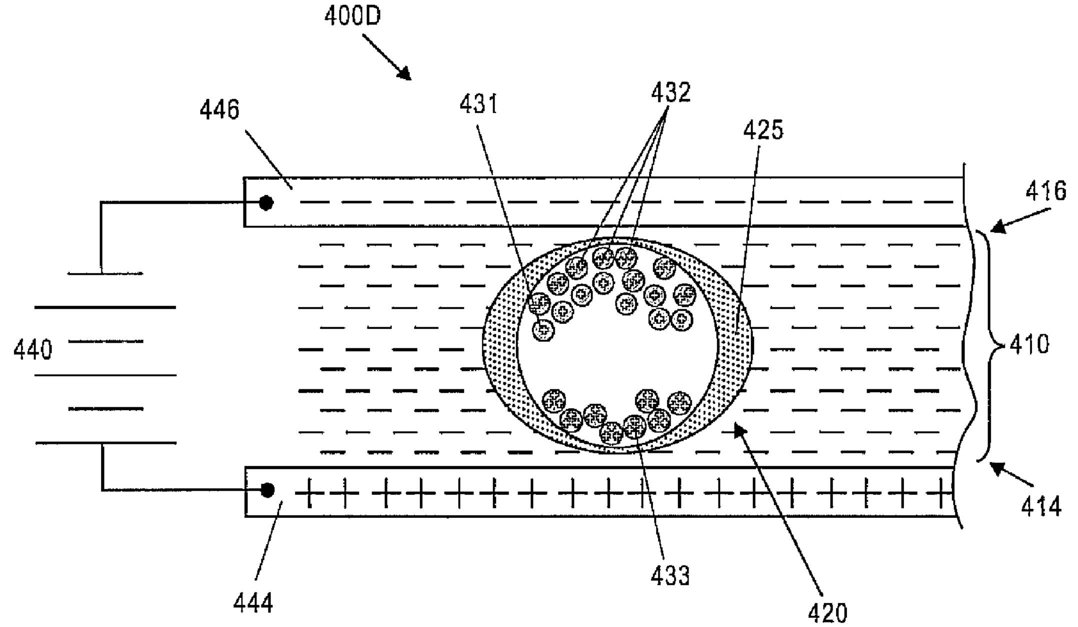

The method can also include applying an electric field above a threshold value for the first plurality of charged pigments 431 but below the threshold value for the second plurality of charged pigments 432 between one or more of the first electrodes 444 and one or more of the second electrodes 446, as shown in FIG. 4C. The application of an electric field above a threshold value for the first plurality of charged pigments 431 can result in the movement of the first plurality of charged pigments 431 towards one or more of the electrodes 446 having a polarity that is opposite to that of the charged pigments and thereby displaying the first color, as shown in FIG. 4C. The method can further include applying an electric field above a threshold value for the second plurality of charged pigments 432 but below the threshold value for the third plurality of charged pigments 433 between one or more of the first electrodes 444 and one or more of the second electrodes 446, as shown in FIG. 4D. The application of an electric field above a threshold value for the second plurality of charged pigments 432 can result in the movement of the first and second plurality of charged pigments 431, 432 towards one or more of the electrodes 446 having a polarity that is opposite to that of the charged pigments 431, 432, 433 and wherein the second plurality of charged pigments 432 displaces the first plurality of charged pigments 331 and thereby displaying the second color, as shown in FIG. 4D. The method can also include applying an electric field above a threshold value for the third plurality of charged pigments

Figure 4E:
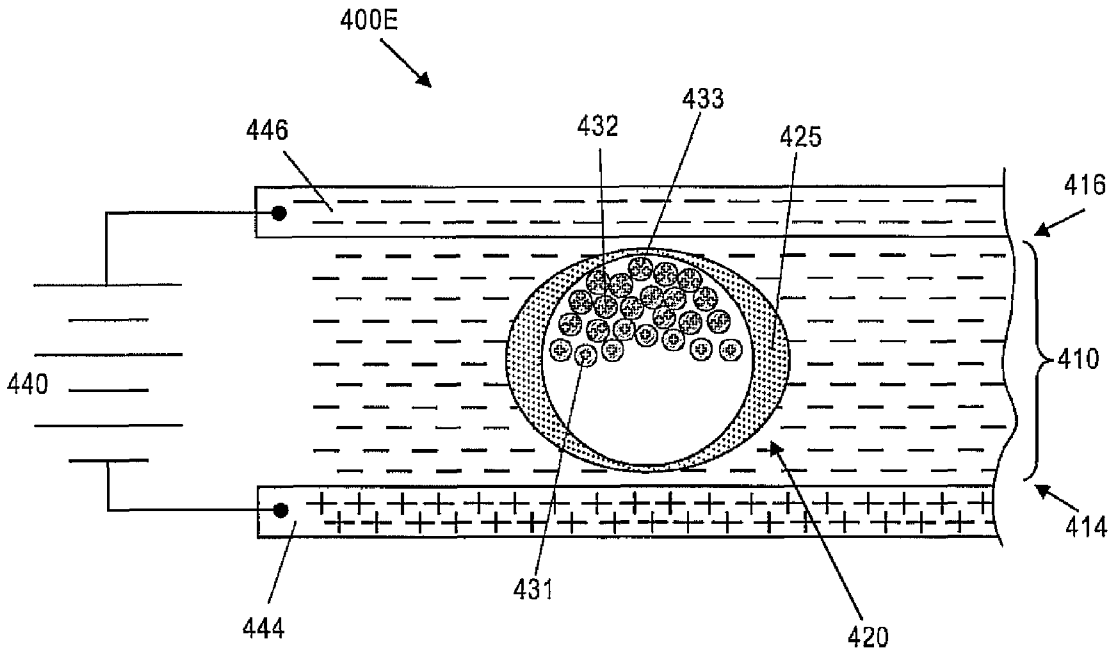
Figure 5:
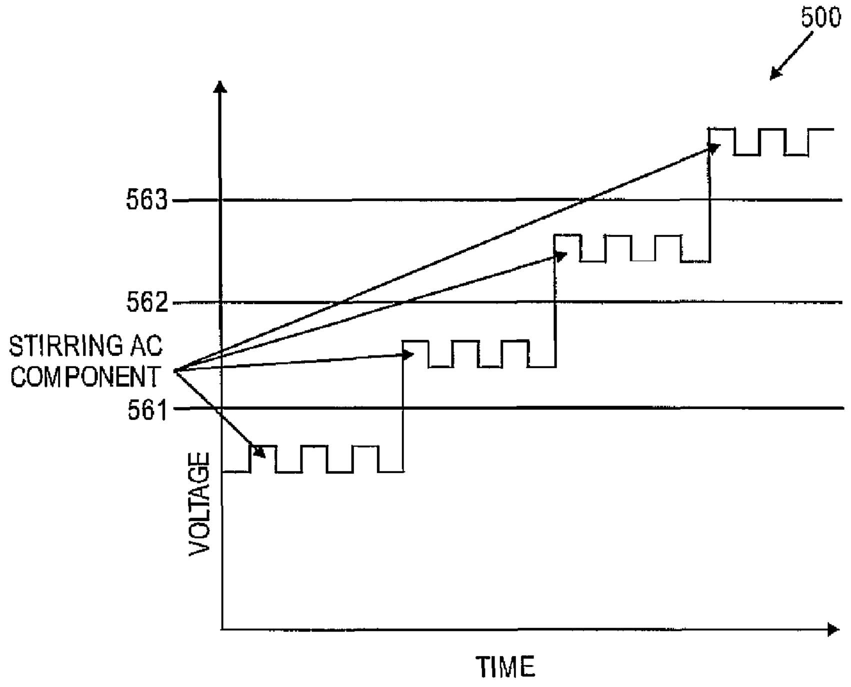
FIG. 5 is a graph showing voltage with AC component.

433 between one or more of the first electrodes 444 and one or more of the second electrodes 446 thereby resulting in the movement of the first, second, and third plurality of charged pigments 431, 432, 433 towards one or more of the electrodes 446 having a polarity that is opposite to that of the charged pigments and wherein the third plurality of charged pigments 433 displaces the first and second plurality of charged pigments 431, 432 and thereby displaying the third color, as shown in FIG. 4E. In various embodiments, the method can further include applying a voltage 500 with an alternating current component, as shown in FIG. 5, thereby stirring of the plurality of charged pigments 431, 432, 433 and resulting in the layering of the charged pigments and color, wherein the first plurality of charged pigments 131, 331, 431 can have a first threshold value 561, the second plurality of charged pigments 132, 332, 432 can have a second threshold value 562, and the third plurality of charged pigments 133, 333, 433 can have a third threshold value 563. In some embodiments, the method can also include removing the electric field between one or more of the first electrodes 444 and one or more of the second electrodes 446 thereby substantially ceasing the movement of the charged pigments, 431, 432, 433 and wherein the plurality of charged pigments 431, 432, 433 remain substantially in their position.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms “including”, “includes”, “having”, “has”, “with”, or variants thereof are used in either the detailed description and the claims, such terms are intended to be inclusive in a manner similar to the term “comprising.”

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for electronic paper comprising:

an electret substrate; and a plurality of capsules disposed in the electret substrate, wherein each of the plurality of capsules comprises, a first plurality of charged pigments with a first color and a first charge, a second plurality of charged pigments with a second color and a second charge greater than the first charge, a third plurality of charged pigments with a third color and a third charge greater than the second charge, a fluid, and a spherically asymmetric and cylindrically symmetric housing configured to house the plurality of charged pigments and the fluid.

2. The system of claim 1, wherein the housing comprises one or more of a high permittivity dielectric material and a low permittivity dielectric material.

3. The system of claim 1, further comprising:

a plurality of first electrodes interfaced with a first side of the electret substrate, wherein the first electrodes are spatially separated from one another;

a plurality of second electrodes interfaced with a second side of the electret substrate, wherein the second electrodes are spatially separated from one another; and a power supply that provides an external electric field between one or more of the first electrodes and one or more of the second electrodes.

4. The system of claim 3, wherein each of the first electrodes and the second electrodes comprises a multiplexing electrode array.

5. A system for electronic paper comprising:

an electret substrate comprising a majority of charges substantially at a surface of the electret; and a plurality of capsules disposed in the electret substrate, wherein each of the plurality of capsules comprises, a first plurality of charged pigments with a first color and a first charge, a second plurality of charged pigments with a second color and a second charge greater than the first charge, a third plurality of charged pigments with a third color and a third charge greater than the second charge, a fluid, and a housing configured to house the plurality of charged pigments, and the fluid.

6. The system of claim 5, further comprising:

a plurality of first electrodes interfaced with a first side of the electret substrate, wherein the first electrodes are spatially separated from one another;

a plurality of second electrodes interfaced with a second side of the electret substrate, wherein the second electrodes are spatially separated from one another; and a power supply that provides an external electric field between one or more of the first electrodes and one or more of the second electrodes.

7. The system of claim 6, wherein each of the first electrodes and the second electrodes comprises a multiplexing electrode array.

8. An apparatus for an electrophoretic display, the apparatus comprising:

an electret substrate; and a plurality of capsules disposed in the electret substrate, wherein each of the plurality of capsules comprises a first plurality of charged pigments with a first charge, a second plurality of charged pigments with a second charge greater than the first charge, a third plurality of charged pigments with a third charge greater than the second charge, and a fluid;

wherein the plurality of charged pigments are subjected to a non-uniform electric field.

9. The apparatus of claim 8, wherein the non-uniform electric field is due to each of the plurality of capsules comprising a spherically asymmetric and cylindrically symmetric housing configured to house the plurality of charged pigments and the fluid.

10. The apparatus of claim 9, wherein the housing comprises a low permittivity dielectric material in an oblate spheroid configuration with a first pole and a second pole along the first axis with a first thickness and an equator with a second thickness, wherein the first thickness is less than the second thickness.

11. The apparatus of claim 9, wherein the housing comprises a high permittivity dielectric in a prolate spheroid configuration with a first pole and a second pole along the first axis with a first thickness and an equator with a second thickness, wherein the first thickness is greater than the second thickness.

12. The apparatus of claim 8, wherein the non-uniform electric field is due to the electret substrate comprising a majority of charges substantially at a surface of the electret.

13. The apparatus of claim 8 further comprising:

a plurality of first electrodes interfaced with a first side of the electret substrate, wherein the first electrodes are spatially separated from one another;

a plurality of second electrodes interfaced with a second side of the electret substrate wherein the second electrodes are spatially separated from one another; and a power supply that provides an external electric field between one or more of the first electrodes and one or more of the second electrodes.

14. The apparatus of claim 13, wherein each of the first electrodes and the second electrodes comprises a multiplexing electrode array.

* * * * *